United States Patent [19]
Nagai

[11] Patent Number: 5,626,030
[45] Date of Patent: May 6, 1997

[54] REFRIGERANT FLOW AMOUNT CONTROL VALVE AND REFRIGERATING APPARATUS THEREWITH

[75] Inventor: Toshitake Nagai, Gunma-ken, Japan

[73] Assignee: Sanyo Electric Co., Ltd., Osaka, Japan

[21] Appl. No.: 562,046

[22] Filed: Nov. 22, 1995

[30] Foreign Application Priority Data

Nov. 24, 1994 [JP] Japan ................................. 6-290015

[51] Int. Cl.⁶ ................................................. F25B 41/04
[52] U.S. Cl. .................... 62/324.6; 62/222; 137/599.2
[58] Field of Search ............................. 62/324.6, 324.1, 62/222, 159, 160, 527; 137/599.2

[56] References Cited

U.S. PATENT DOCUMENTS

| | | | |
|---|---|---|---|
| 4,306,422 | 12/1981 | Korycki | 62/324.6 |
| 5,004,008 | 4/1991 | Drucker | 137/504 |
| 5,081,847 | 1/1992 | Anderson | 62/222 |
| 5,301,714 | 4/1994 | Johnson | 137/599.2 |

FOREIGN PATENT DOCUMENTS

| | | | |
|---|---|---|---|
| 584983 | 10/1959 | Canada | 137/599.2 |
| 312365 | 12/1989 | Japan | 62/324.6 |

*Primary Examiner*—William Doerrler
*Attorney, Agent, or Firm*—Darby & Darby

[57] ABSTRACT

A refrigerant flow amount control valve has a construction for adjusting the amount of flow of a refrigerant in a predetermined range and a bypass for allowing the refrigerant to flow without passing through the construction when the valve is in an open state. The construction and the bypass are disposed in parallel to form a common refrigerant flow path through the valve.

14 Claims, 6 Drawing Sheets

REFRIGERANT FLOW AMOUNT CONTROL VALVE AND REFRIGERATING APPARATUS THEREWITH

BACKGROUND OF THE INVENTION

The present invention relates to a refrigerating apparatus having a refrigerating cycle and in particular to a flow amount control valve for controlling the amount of flow of a refrigerant.

In addition, the present invention relates to a refrigerating apparatus having a flow amount control valve for adjusting the amount of flow of a refrigerant that is circulated in a refrigerating cycle.

As a related art reference, a refrigerating flow amount control valve (disclosed in Japanese Patent Examined Publication No. 578739) is known. In the related art reference, the rotating motion of a stepping motor is converted into upward and downward motions of a tapered spindle (valve) through a gear. The amount of flow of the refrigerant is varied based on the amount of the space between an end of the spindle and a valve seat located in the refrigerant flow path.

The spindle moves upwardly and downwardly corresponding to the rotating angle of the stepping motor and varies the amount of the gap with the valve seat, thereby freely control the amount of the refrigerant.

In the conventional refrigerant flow amount control valve, the amount of flow of the refrigerant is adjusted corresponding to the amount of gap between the end of the spindle and the valve seat. Thus, the maximum amount of flow of the refrigerant depends on the refrigerant flow path formed at the valve seat.

The refrigerant flow amount control valve that has the above-described construction is used as an expansion means (such as an electric expanding valve or a capillary tube that throttles the flow amount of the refrigerant) in the refrigerating cycle. Thus, even if the refrigerant flow amount control valve has a pressure loss there is no problem. Instead, the refrigerant flow amount control valve is used to adjust the pressure loss.

However, when a refrigerant cycle that restricts the flow direction of the refrigerant in a heat exchanger is designed, if the refrigerating cycle is reversely operated, the position of the expansion means should be changed depending on the input side or the output side of the heat exchanger.

In other words, when the refrigerant flow amount control valve on the input side of the heat exchanger is used as an expansion means, if the refrigerant flow amount control valve on the output side of the heat exchanger has a pressure loss, the operation efficiency of the refrigerating cycle deteriorates. Likewise, when the refrigerant flow amount control valve on the output side of the heat exchanger is used as an expansion means, if the refrigerant flow amount control valve on the input side of the heat exchanger has a pressure loss, the operation efficiency of the refrigerating cycle deteriorates.

Thus, in the conventional construction, a pipe with a larger diameter is disposed in parallel with the refrigerant flow amount control valve so as to prevent a pressure loss from taking place and to bypass the refrigerant flow amount control valve that is not used as an expansion means.

Consequently, the conventional refrigerant flow amount control valve always requires a bypass valve that controls the flow in the bypass pipe. Thus, since the number of valves increases and the size of the refrigerating apparatus therewith increases, the requirement for a size reduction of the apparatus cannot be satisfied.

In addition to the refrigerant flow amount control valve, since a drive circuit and a control device for the bias valve are required, the control process of the refrigerating apparatus becomes complicated.

SUMMARY OF THE INVENTION

A refrigerant flow amount control valve according to the present invention comprises a construction for adjusting the amount of flow of a refrigerant in a predetermined range in a single flow path direction thereof, and a bypass for causing the refrigerant to flow without passing through the construction when in an open state, wherein the construction and the bypass are disposed in the same refrigerant flow path.

A refrigerating apparatus according to the present invention has a refrigerating cycle including a compressor, a condenser, an expansion means, and an evaporator according to the present invention, wherein the expansion means has a refrigerant flow amount control valve including a construction for adjusting the amount of flow of a refrigerant in a predetermined range in a single flow path direction thereof, and a refrigerant flow path for causing the refrigerant to flow without passing through the construction when in an open state.

A refrigerating apparatus according to the present invention comprises a refrigerant flow path switching means for causing a refrigerant to flow in a refrigerating cycle that includes a compressor, a heat-source-side heat exchanger, an expansion means, and a user-side heat exchanger. When in a cooling operation state these devices are in the order of the compressor, the heat-source-side heat exchanger, the expansion means, and the user-side heat exchanger. When heating in a heating operation state these devices in the refrigerating cycle are in the order of the compressor, the user-side heat exchanger, the expansion means, and the heat-source-side heat exchanger. The refrigerant flow path switching means is adapted for switching a refrigerant flow path so that the direction of the refrigerant flow path in the heat-source-side heat exchanger and/or the user-side heat exchanger is always constant, and wherein the expansion means includes a first refrigerant flow amount control valve connected to both refrigerant pipes of the user-side heat exchanger and adapted for adjusting the flow amount of the refrigerant in the cooling operation state, and for allowing the refrigerant to flow with almost no pressure loss in the heating operation state. A second refrigerant flow amount control valve is adapted for adjusting the flow amount of the refrigerant in the heating operation state and for allowing the refrigerant to flow with almost no pressure loss in the cooling operation state.

The refrigerant flow amount control valve further comprises a first valve seat disposed on a secondary side of the single flow direction of the refrigerant, a second valve seat disposed on a primary side of the single flow direction of the refrigerant, and a valve body for adjusting the flow amount of the refrigerant of a second refrigerant flow path formed in the second valve seat. The second valve seat comprises the second refrigerant flow path formed at a position that is opposite to a first refrigerant flow path formed in the first valve seat. A third refrigerant flow path is formed on the outer periphery of the second refrigerant flow path as an independent refrigerant flow path. The third refrigerant flow path is formed at a position that is not opposite to the first refrigerant flow path of the first valve seat. A construction is provided for forwardly and backwardly moving the second valve seat against the refrigerant flow direction.

The refrigerant flow amount control valve according to the present invention further comprises a first valve seat disposed on a secondary side of the single flow direction of the refrigerant, a first refrigerant flow path formed in the first valve seat, a second valve seat tensioned to the first valve seat so as to close the first refrigerant flow path, a second refrigerant flow path that is formed in the second valve seat, which has a smaller flow path area than the first refrigerant flow path of the first valve seat. The second refrigerant flow path is formed opposite to the first refrigerant flow path. A valve body is provided which is adapted for moving forwardly and backwardly against the refrigerant flow direction so as to vary the amount of flow of the refrigerant in the second refrigerant flow path. The refrigerant flow amount control valve also has a third refrigerant flow path that is formed on the outer periphery of the second refrigerant flow path as an independent refrigerant flow path. It is formed at a position that is not opposite to the first refrigerant flow path of the first valve seat. Also a construction is provided for causing the second valve seat, which is tensioned to the first valve seat, to be separated from the first valve seat when the valve body moves a predetermined amount in the direction where the flow amount of the refrigerant of the second refrigerant flow path increases.

The refrigerant flow amount control valve according to the present invention further comprises a first valve seat disposed on a secondary side of the single flow direction of the refrigerant, a first refrigerant flow path formed in the first valve seat, a second valve seat tensioned to the first valve seat so as to close the first refrigerant flow path, a second refrigerant flow path which is formed in the second valve seat, that has a smaller flow path area than the first refrigerant flow path of the first valve seat. The second refrigerant flow path is formed opposite to the first refrigerant flow path. A valve body is provided which is adapted for moving forwardly and backwardly against the refrigerant flow direction so as to vary the amount of flow of the refrigerant in the second refrigerant flow path. The refrigerant flow amount control valve also has a third refrigerant flow path that is formed on the outer periphery of the second valve seat as an independent refrigerant flow path. It is formed at a position that is not opposite to the first refrigerant flow path of the first valve seat. Also a construction is provided for causing the second valve seat, which is tensioned to the first valve seat, to be separated from the first valve seat when the valve body moves a predetermined amount in the direction where the flow amount of the refrigerant of the second refrigerant flow path increases.

The refrigerant flow amount control valve according to the present invention comprises a first valve seat disposed on a secondary side of the single flow direction of the refrigerant, a second valve seat disposed on a primary side of the single flow direction of the refrigerant, and a valve body for adjusting the flow amount of the refrigerant of a second refrigerant flow path formed in the second valve seat. In addition, the second valve seat comprises the second refrigerant flow path formed at a position that is opposite to a first refrigerant flow path formed in the first valve seat, a third refrigerant flow path formed on the outer periphery of the second refrigerant flow path where as an independent refrigerant flow path, the third refrigerant flow path is formed at a position that is not opposite to the first refrigerant flow path of the first valve seat, and a construction for forwardly and backwardly moving the second valve seat against the refrigerant flow direction.

The refrigerant flow amount control valve according to the present invention comprises a first valve seat disposed on a secondary side of the single flow direction of the refrigerant, a first refrigerant flow path formed in the first valve seat, a second valve seat tensioned to the first valve seat so as to close the first refrigerant flow path, a second refrigerant flow path that is formed in the second valve seat, which has a smaller flow path area than the first refrigerant flow path of the first valve seat. The second refrigerant flow path that is formed opposite to the first refrigerant flow path. A valve body is provided which is adapted for moving forwardly and backwardly against the refrigerant flow direction so as to vary the flow amount of the refrigerant in the second refrigerant flow path. The refrigerant flow amount control valve also has third refrigerant flow path that is formed on the outer periphery of the second refrigerant flow path as m independent refrigerant flow path. It is formed at a position that is not opposite to the first refrigerant flow path of the first valve seat. Also a construction is provided for causing the second valve seat, which is tensioned to the first, valve seat to be separated from the first valve seat when the valve body moves a predetermined amount in the direction where the flow amount of the refrigerant of the second refrigerant flow path increases.

A refrigerant flow amount control valve according to the present invention comprises a valve seat disposed in a refrigerant flow path, a first valve body for adjusting the amount of flow of the refrigerant in a first refrigerant flow path of the valve seat, a second valve body for adjusting the amount of flow of the refrigerant of a second refrigerant flow path disposed on the outer periphery of the first refrigerant flow path different from the first refrigerant flow path of the valve seat, and a construction for causing the second valve body to move in the amount of direction where the flow of the refrigerant that flows in the second refrigerant flow path increases when the first valve body moves for a predetermined mount in the direction where the amount of flow of the refrigerant in the first refrigerant flow path increases.

Thus, the refrigerant flow amount control valve that has the above-described construction can vary the amount of flow of the refrigerant in the range from the fully opened state, where the refrigerant flows without a pressure loss, to a desired pressure loss state where the refrigerant flows with the pressure loss (in this state, the valve functions as a expansion means).

The refrigerant flow amount control valve used in the refrigerating apparatus that has the above-described construction functions as a expansion means and an open/close valve for bypassing the refrigerant. Thus, the number of valves that make up the refrigerating cycle can be reduced.

The refrigerant flow amount control valve can vary the amount of flow of the refrigerant in the range from the fully opened state, where the refrigerant flows without a pressure loss, to a desired pressure loss state where the refrigerant flows with a pressure loss (in this state, the valve functions as a expansion means), and to the fully closed state where the refrigerant does not flow.

In addition, in the refrigerating apparatus having the refrigerant flow amount control valve that has the above-described construction, the flow amount control valve functions as an expansion means, an open/close valve for bypassing the refrigerant, and a fully closing valve that shuts off the flow path of the refrigerant. Thus, the number of valves that make up the refrigerating cycle can be reduced.

DETAILED DESCRIPTION OF THE PREFERRED EMBODIMENT

Figure 1:
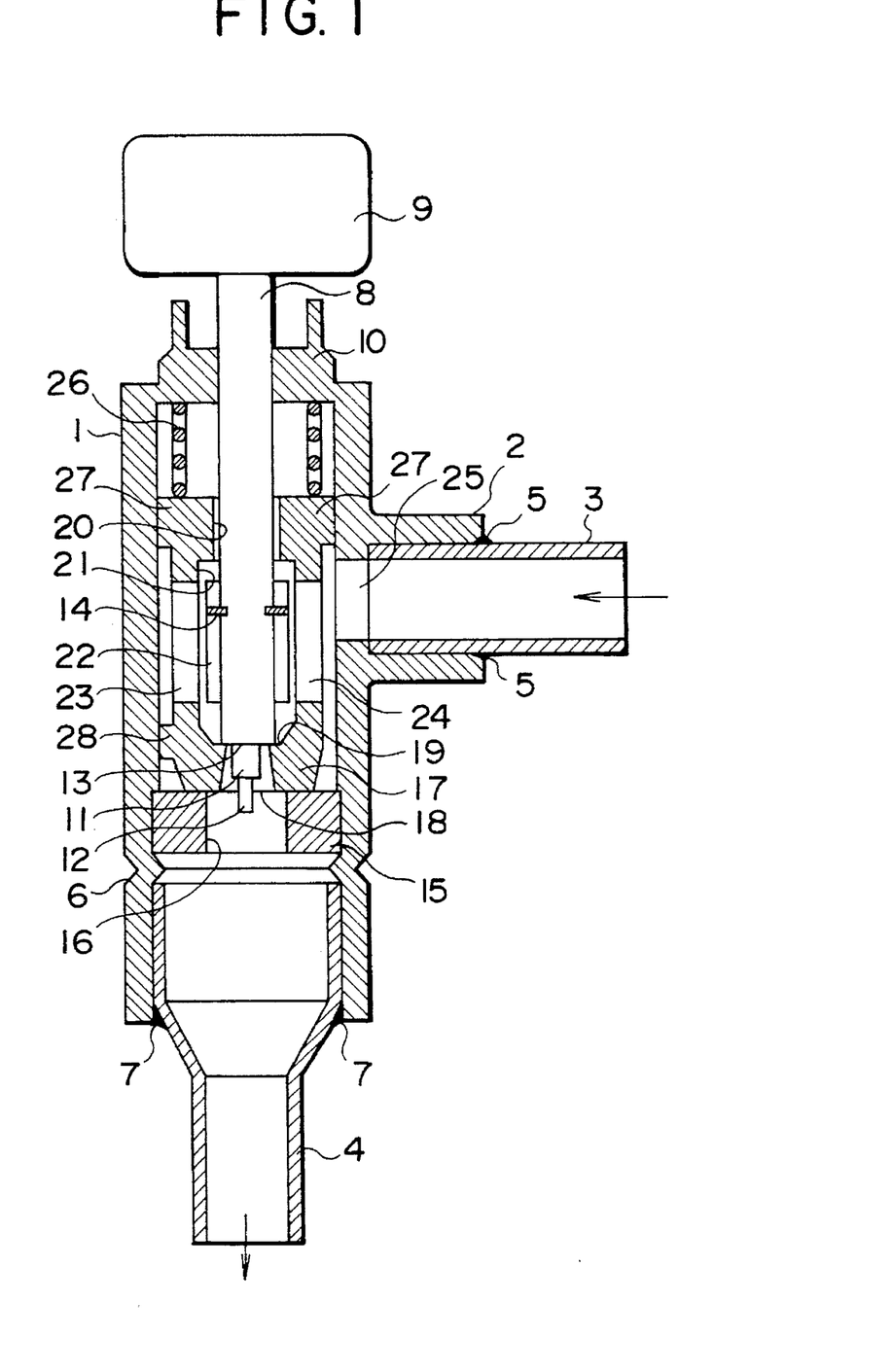
FIG. 1 is a principle sectional view of an example of a refrigerant flow amount control valve according to the present invention.

Next, with reference to the accompanying drawings, an embodiment of the present invention will be described. FIG. 1 is a principle sectional view showing an example of a refrigerant flow amount control valve according to the present invention. Reference numeral 1 is a cylindrical main body. A connection portion 2, into which a refrigerant pipe 3 is inserted, is disposed on an input side (primary side) of the cylindrical main body 1. An end-widened refrigerant pipe 4 is inserted into an opening side (secondary side) of the cylindrical main body 1. The refrigerant pipe 3 is press fit into the connection portion 2. Thereafter, the connection between the refrigerant pipe 3 and the connection portion 2 are sealed with wax 5. The end-widened portion of the refrigerant pipe 4 is press fit into a throttle portion 6 of the main body 1. As with the refrigerant pipe 3, the connection between the refrigerant pipe 4 and the throttle portion 6 of the main body 1 is sealed with wax 7.

A drive portion 9 of a spindle 8 (SUS 303) is disposed on another open side of the main body 1. The spindle 8 (valve body) seals the inside of the main body 1 at a thrust support portion 10 thereof and moves upwardly and downwardly depending on the rotation angle of the drive portion (for example, a stepper motor) 9. Since the construction for upwardly and downwardly moving the spindle 8, can be the conventional construction (for example, as disclosed in Japanese Patent Examined Publication No. 57889), the description is omitted. Likewise, the construction that secures the drive portion 9 is omitted.

The refrigerant flow amount control valve that has the above-described construction causes the refrigerant to flow from the refrigerant pipe 3 (the primary side) to the refrigerant pipe 4 (the secondary side).

At an end 13 of the spindle 8, shoulder portions 11 and 12 are disposed. The shapes of the shoulder portions 11 and 12 are concentric circles of the shape of the spindle 8. The diameter of the shoulder portion 12 is smaller than the diameter of the shoulder portion 11. The diameter of the shoulder portion 11 is smaller than the diameter of the spindle 8.

Reference numeral 14 is a ring shape metal member. The ring shape metal member 14 is secured to a groove formed at a predetermined position of the spindle 8. The outer periphery of the ring shape metal member 14 is smaller than the inner diameter of a moving valve seat (second valve member) that will be described later. The shoulder members 11 and 12 may be formed in a combination of cone shapes or a continuous cone shape.

Reference numeral 15 is a cylindrical valve seat (first valve seat). After the cylindrical valve seat 15 is press fit into one opening of the main body 1, a part of the main body 1 is throttled and thereby a throttle portion 6 is formed. Thus, the valve seat 15 is secured in the main body 1. At the center of the valve seat 15, a cylindrical opening 16 (first refrigerant flow path) is formed. The center of the opening 16 accords with the center axis of the spindle 8.

Reference numeral 17 is the above-mentioned moving valve seat (second valve seat). The moving valve seat 17 can be moved upwardly and downwardly in the main body 1. An opening 18 (second refrigerant flow path) is formed in the moving valve seat 17 on the side of the refrigerant pipe 4. The shape of the opening 18 is a concentric circle of the shape of the spindle 8. In addition, the opening 18 (secondary refrigerant flow path) widens toward the refrigerant pipe 4 (secondary side).

At the position where the opening 18 faces the opening 16, the diameter of the opening 18 is smaller than the diameter of the opening 16. Thus, when the moving valve seat 17 contacts the valve seat 15, the opening 16 and the opening 18 are connected and thereby a flow path of the refrigerant is formed.

Reference numeral 19 is a bottom surface formed in the moving valve seat 17. When the spindle 8 moves upwardly and downwardly and the end 13 thereof contacts the bottom surface 19, the opening 18 is closed. At this point, the shoulder portions 11 and 12 are housed in the openings 18 and 16 of the first and moving valve seats 17 and 15, respectively.

Reference numeral 20 is another opening of the moving valve seat 17. The spindle 8 freely moves in the opening 20. The diameter of the opening 20 is smaller than the diameter of a cylindrical inner surface 21 of the moving valve seat 17. In addition, the diameter of the opening 20 is smaller than the diameter of the above-mentioned metal member 14. Thus, when the metal member 14 moves upwardly along with the spindle 8, the metal member 14 contacts the opening 20, thereby causing the moving valve seat to move upwardly.

Reference numerals 22, 23, and 24 are connection openings formed on the outer periphery of the moving valve seat 17. The refrigerant flows to the inside of the moving valve seat 17 through the connection openings 22, 23, and 24. The connection openings 22, 23, and 24 are formed so that they face the opening 25, which causes the refrigerant to flow from the connection portion 2 to the main body 1.

Reference numeral 26 is a spring. The spring 26 tensions the moving valve seat 17 to the valve seat 15 with a predetermined amount of force. Thus, in the state of the refrigerant flow amount control valve shown in FIG. 1, the moving valve seat 17 is tensioned to the valve seat 15. The end 13 of the spindle 8 contacts the bottom surface 19 of the moving valve seat 17. Thus, all the refrigerant flow paths are closed (namely, in the fully closed state).

Figure 2:
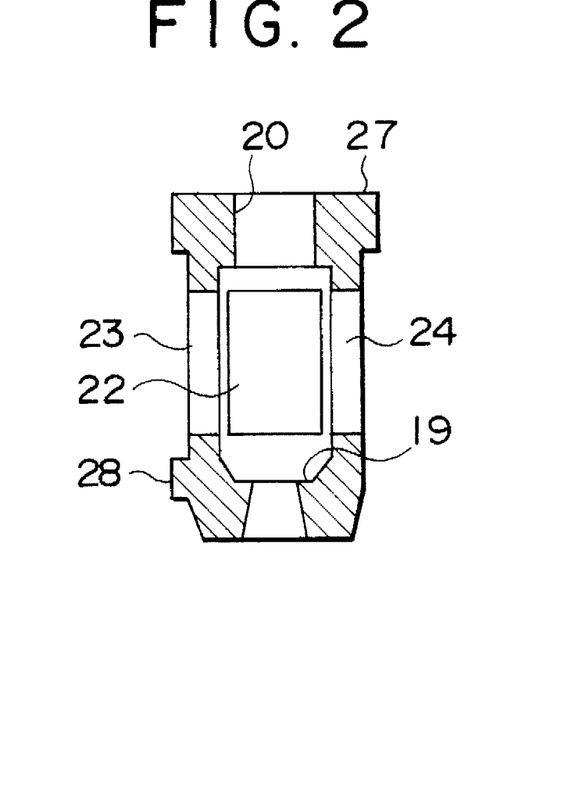
FIG. 2 is a vertical sectional view of the moving valve seat shown in FIG. 1.
Figure 3:
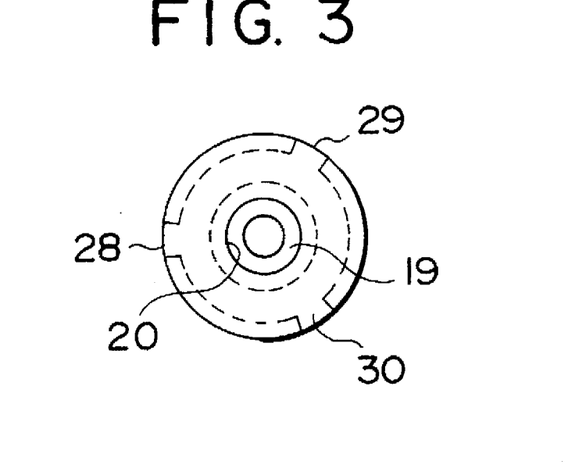
FIG. 3 is a top view of the moving valve seat shown in FIG. 1.

FIG. 2 is a vertical sectional view showing the moving valve seat 17. FIG. 3 is a top view showing the moving valve seat 17. In these drawings, reference numeral 27 is a flange portion. The outer diameter of the flange portion 27 is almost the same as the inner diameter of the main body 1. The flange portion 27 is formed on the side toward the spring 26. Reference numerals 28, 29, and 30 are protrusions. The outer diameter of each of the protrusions 28, 29, and 30 is almost the same as the inner diameter of the main body 1. The provisions 28, 29, and 30 are formed on the moving valve seat 17 on the side toward the valve seat 15.

Since the outer diameter of each of the flange 27 and the protrusions 28 to 30 is almost the same as the inner diameter of the main body 1, the moving valve seat 17 can move upwardly and downwardly in the main body 1 without deviation of the center axes of the openings 18 and 20.

Figure 4:
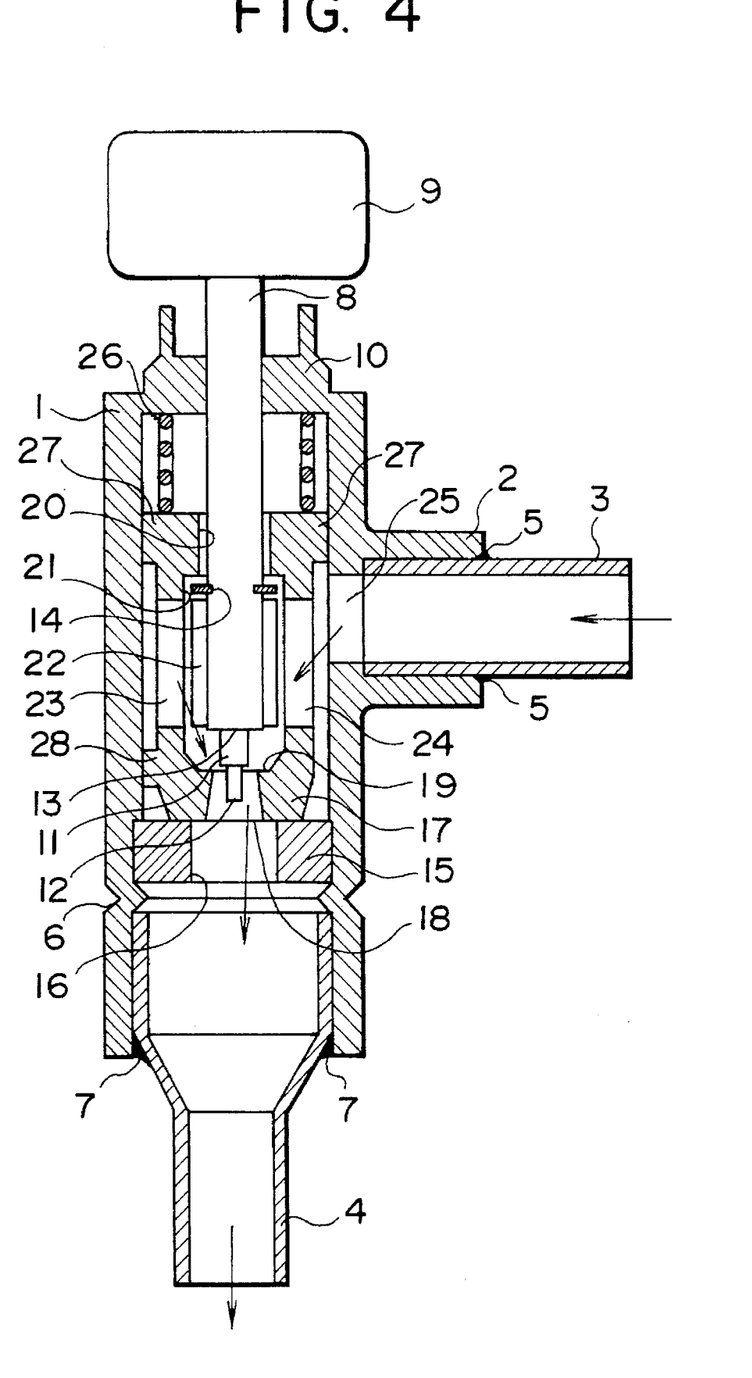
FIG. 4 is a descriptive view showing the state in which a driving portion of the refrigerant flow amount control valve shown in FIG. 1 is driven and thereby a spindle is moved upwardly.

FIG. 4 is a descriptive view showing the state in which the drive portion 9 causes the spindle 8 to move upwardly. In this state, since the end 13 of the spindle 8 is spaced from the bottom portion 19 of the moving valve seat 17, the refrigerant that is charged from the refrigerant pipe 3 is discharged through the connection openings 22, 23, 24, the opening 18, 16 and the refrigerant pipe 4.

At this point, the amount of flow of the refrigerant depends on the distance between the end 13 of the spindle 8 and the bottom portion 19 of the moving valve seat 17 (namely, the upward moving distance of the spindle 8) and the difference between each of the shoulder portions 11 and 12 formed at the end 13 of the spindle 8 and the diameter of the opening 18.

Figure 5:
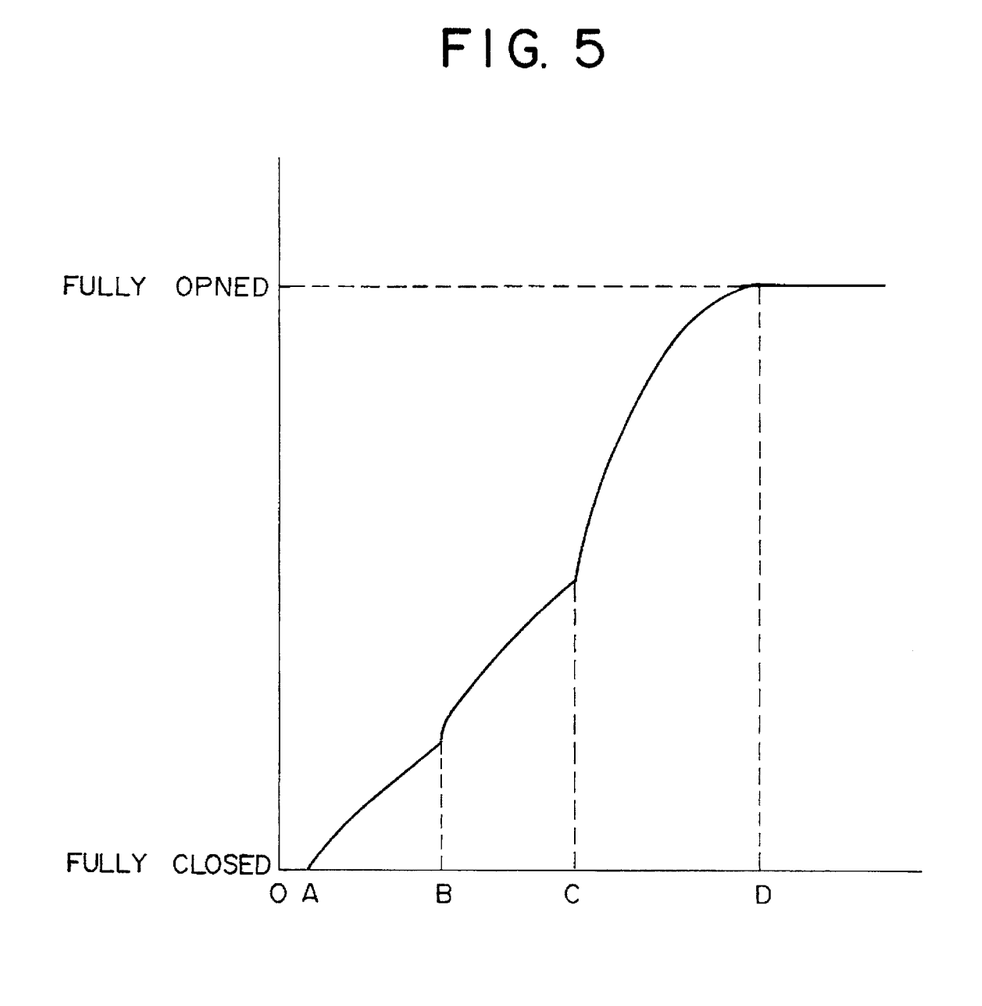
FIG. 5 is a descriptive diagram showing the relation between the upward moving distance of the spindle and the amount of flow of the refrigerant.

FIG. 5 is a descriptive diagram showing the relationship between the upward moving distance of the spindle 8 and the amount of flow of the refrigerant. In FIG. 5, in a region A to B, the shoulder portion 11 formed at the end 13 of the spindle 8 intersects with the bottom portion 19 of the moving valve seat 19. In a region B to C, the shoulder portion 12 intersects with the bottom portion 19 of the moving valve seat 17 moves. In a region C to D, the moving valve seat 17 upwardly moves and a fully opened state (that will be described later) takes place.

Figure 6:
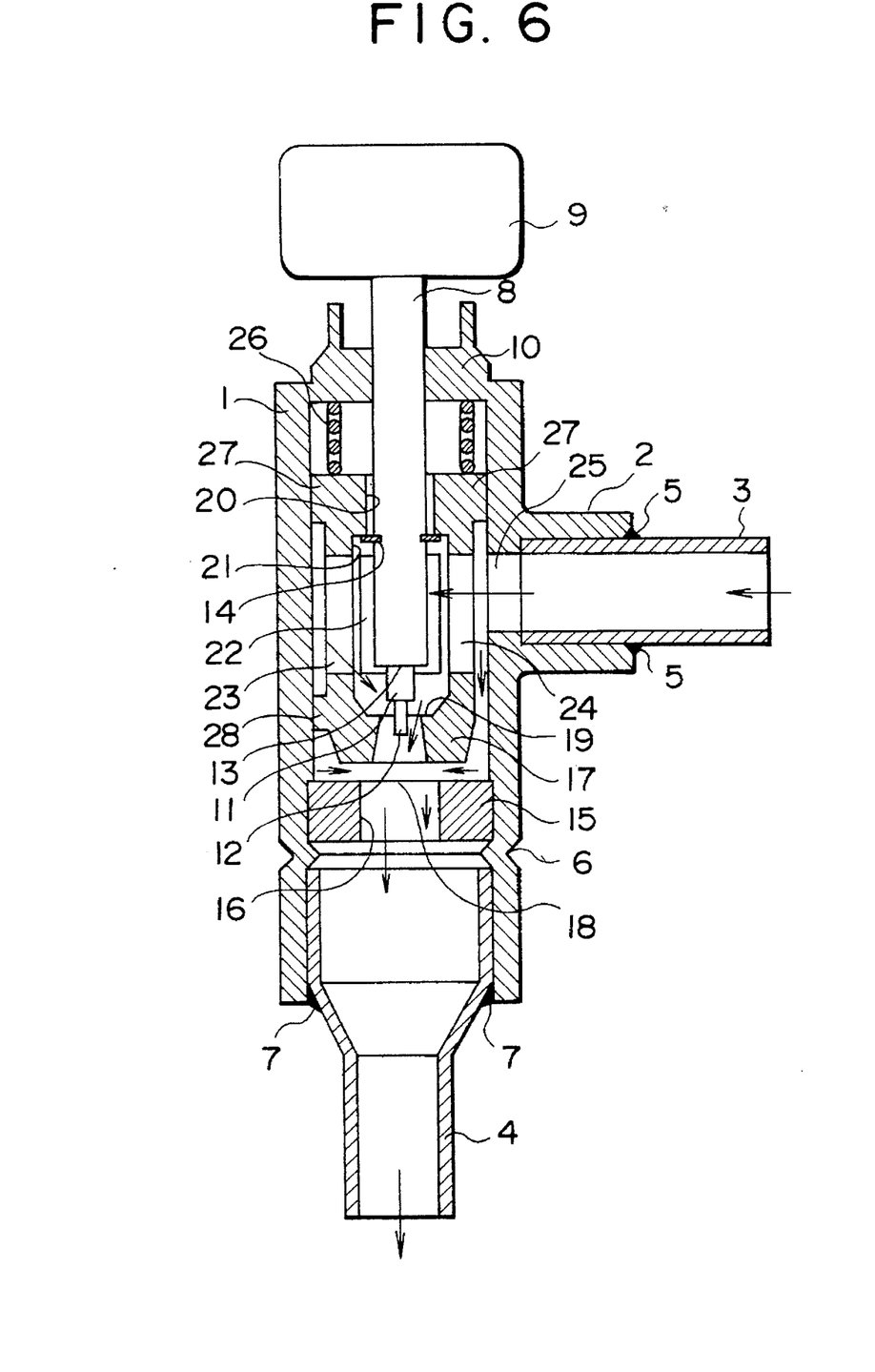
FIG. 6 is a descriptive view showing the state in which the driving portion of the refrigerant flow amount control valve shown in FIG. 1 is driven and thereby the spindle is moved upwardly more than the state shown in FIG. 4.

FIG. 6 is a descriptive schematic diagram showing the state of the refrigerant flow amount control valve in the region C to D of FIG. 5 where the drive portion 9 causes the spindle 8 to move upwardly more than the state shown in FIG. 4. In the drawing, as the spindle 8 moves upwardly, a metal member 14 of the spindle 8 causes the moving valve seat 17 to move upwardly against the tensioning force of the spring 26.

Thus, in addition to the flow path shown in FIG. 4, the refrigerant flows in a gap between the valve seat 15 and the moving valve seat 17 (third refrigerant flow path). As the moving valve seat 17 moves upwardly the flow path satisfactorily widens. Thus, the refrigerant flows in the refrigerant flow amount control valve with almost no pressure loss.

In the embodiment, since the fully opened state of the refrigerant flow amount control valve is designated to the region C to D shown in FIG. 5, the gap (third refrigerant flow path) between the main body 1 and the moving valve seat 17 is large, and the sizes of the inner peripheries of the protrusions 28 to 30 are small so that the refrigerant amount of flow control valve is fully opened after the position D. However, when the fully opened state of the refrigerant flow amount control valve is designated to the region C to D, the gap between the main body 1 and the moving valve seat 17 and the sizes of the inner peripheries of the protrusions 28 to 30 are properly adjusted.

Figure 7:
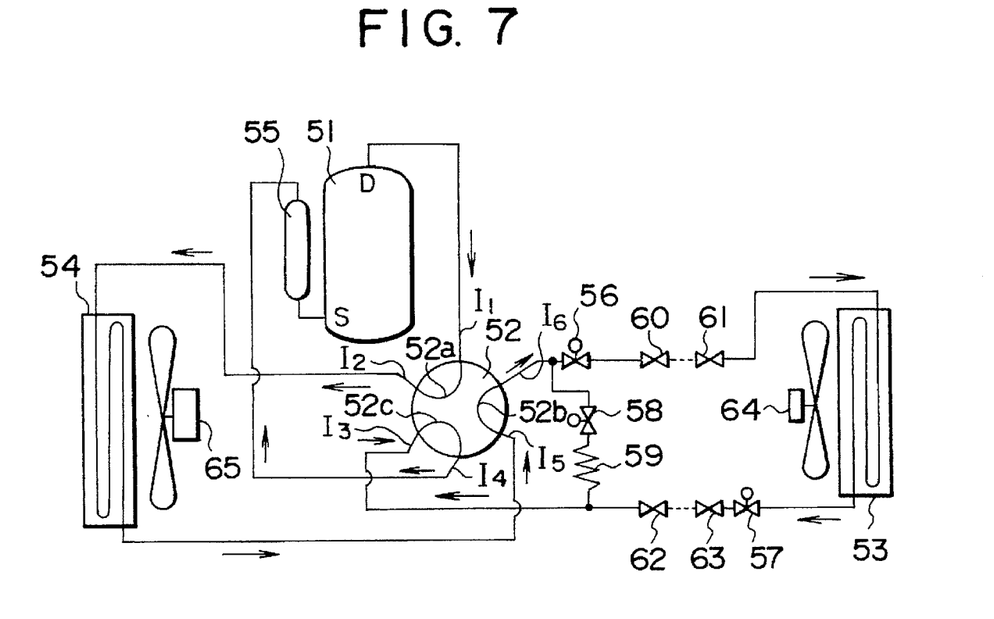
FIG. 7 is a refrigerant circuit diagram showing the flow of the refrigerant in the cooling operation state in which the refrigerant flow amount control valve according to the present invention is used in the refrigerating cycle.
Figure 8:
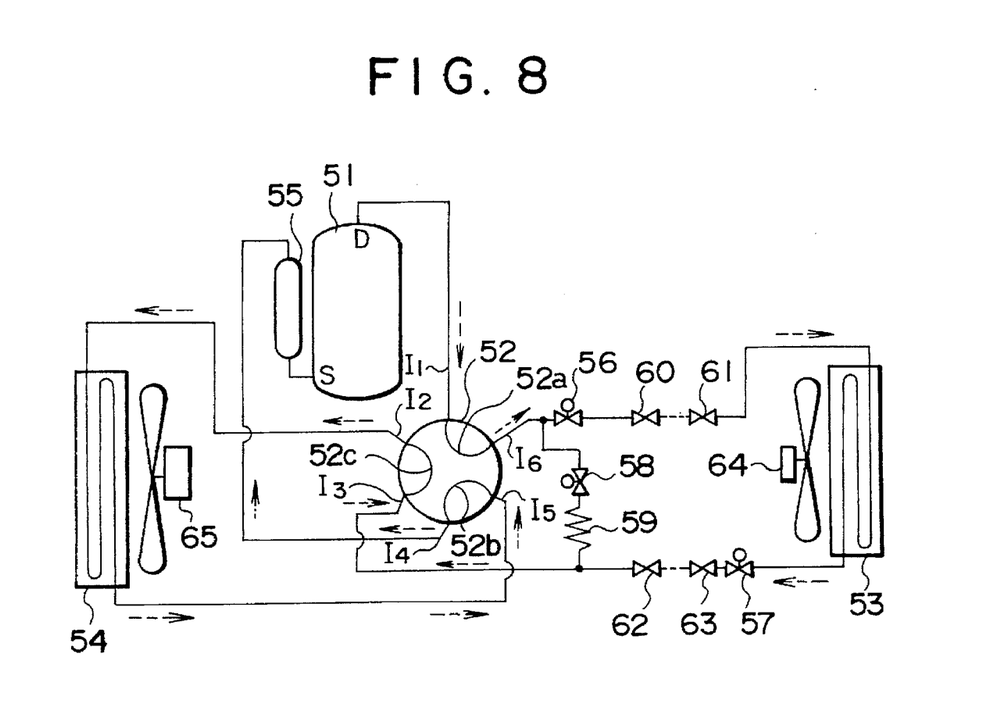
FIG. 8 is a refrigerant circuit diagram showing the flow of the refrigerant in the heating operation state in which the refrigerant flow amount control valve according to the present invention is used in the refrigerating cycle.

FIGS. 7 and 8 show a refrigerating cycle of an air conditioner (refrigerating apparatus) having the above-described refrigerant flow amount control valve.

In FIG. 7, reference numeral 51 is a refrigerant compressor. Reference numeral 52 is a sixway switching valve. Reference numeral 53 is a user-side heat exchanger (for example, an indoor-side heat exchanger). Reference numeral 54 is a heat-source-side heat exchanger (for example, an outdoor-side heat exchanger). Reference numeral 55 is an accumulator. Reference numerals 56 and 57 are refrigerant amount of flow control valves according to the present invention. These portions are connected with refrigerant pipes in a ring shape so as to construct a refrigerating cycle.

Reference numerals 60 to 63 are nipples or connectors that connect pipes. By connecting the nipples with the refrigerant pipes, the refrigerating cycle is separated into an indoor unit and an outdoor unit that have respective devices.

The indoor unit comprises the user-side heat exchanger 53, the refrigerant flow amount control valve 57, and an air blowing device 64 that accelerates the heat exchanging operation of the user-side heat exchanger 53. The refrigerant flow amount control valve 57 causes the refrigerant to flow in the direction as shown in FIG. 1 from the user-side heat exchanger 53 to the nipple 63.

The outdoor unit comprises the compressor 51, the accumulator 55, the sixway switching valve 52, the refrigerant flow amount control valve 56, the heat-source-side heat exchanger 54, and an air blowing device 65. The accumulator 55 is connected to a sucking side (S) of the compressor. The air blowing device 65 accelerates the heat exchanging operation of the heat-source-side heat exchanger 54. The refrigerant flow amount control valve 56 causes the refrigerant to flow in the direction as shown in FIG. 1 from the sixway switching valve 52 to the nipple 60.

The sixway switching valve 52 has refrigerant flow paths 52a, 52b, and 52c. The sixway switching valve 52 changes the connections of refrigerant pipes I1 to I6 through their flow paths. When the flow paths 52a, 52b, and 52c of the sixway switching valve 52 are in the state as shown in FIG. 7, compressed refrigerant discharged from the discharging opening (D) of the compressor 51 flows in the directions of solid arrow lines of the refrigerating cycle so that the user-side heat exchanger 53 can perform a cooling operation.

The refrigerant discharged from the compressor 51 returns to the compressor 51 through the pipe I1, the flow path 52a of the sixway switching valve 52, the pipe I2, the heat-source-side heat exchanger 54, the pipe I5, the flow path 52b of the sixway switching valve 52, the pipe I6, the refrigerant flow amount control valve 56, the user-side heat exchanger 53, the refrigerant flow amount control valve 57, the pipe I3, the flow path 52c of the sixway switching valve 52, and the pipe I4 so as to form a refrigerating cycle. At this point, the refrigerant flow amount control valve 57 controls the flow amount of the refrigerant in the regions A to C shown in FIG. 5. The refrigerant flow amount control valve 57 is in the fully opened state (the refrigerant flows with almost no pressure loss) at the position D.

At this point, since the solenoid valve 58 is in the fully closed state, the refrigerant discharged from the compressor 51 is condensed by the heat-source-side heat exchanger 54. Thereafter, the pressure of the refrigerant is reduced by the refrigerant flow amount control valve 56. Next, the refrigerant is evaporated by the user-side heat exchanger 53. As a result, the user-side heat exchanger 53 performs the cooling operation. The flow amount of the refrigerant or the reduced pressure amount of the refrigerant is controlled by the refrigerant flow amount control valve corresponding to the upward and downward motions of the spindle 8 so that the evaporation temperature or evaporation pressure of the refrigerant of the user-side heat exchanger 53 becomes optimum.

FIG. 8 shows a refrigerating cycle of which the flow path of the sixway switching valve 52 is switched so that the user-side heat exchanger 53 performs the heating operation. In the drawing, the difference between the refrigerating cycles shown in FIGS. 7 and 8 is that the positions of the flow paths 52a to 52c of the sixway switching valve 52 are changed. Thus, since other constructional portions are the stone as those shown in FIG. 7, their description is omitted.

In FIG. 8, when the flow paths 52a, 52b, and 52c of the sixway switching valve 52 are in the states as shown in FIG. 8, compressed refrigerant discharged from the discharging opening (D) of the compressor 51 flows in the directions of the dashed arrow lines of the refrigerating cycle so that the user-side heat exchanger 53 can perform a heating operation.

The refrigerant discharged from the compressor 51 returns to the compressor 1 through the pipe I1, the flow path 52a of the sixway switching valve 52, the pipe I6, the refrigerant amount of flow control valve 56, the user-side heat exchanger 53, the refrigerant flow amount control valve 57, the pipe I3, the flow path 52c of the sixway switching valve 52, the pipe I2, the heat-source-side heat exchanger 54, the pipe I5, the flow path 52b of the sixway switching valve 52, the pipe I4, and the accumulator 55 so as to form a refrigerating cycle. At this point, the refrigerant flow amount control valve 57 controls the flow amount of the refrigerant in the regions A to C shown in FIG. 5. The refrigerant amount of flow control valve 56 is in the fully opened state (the refrigerant flows with almost no pressure loss) at the position D.

At this point, since the solenoid valve 58 is in the fully closed state, the refrigerant discharged from the compressor 51 is condensed by the heat-source-side heat exchanger 53. Thereafter, the pressure of the refrigerant is reduced by the refrigerant amount of flow control valve 57. Next, the refrigerant is evaporated by the user-side heat exchanger 54. As a result, the user-side heat exchanger 53 performs the heating operation. The amount of flow of the refrigerant or the reduced pressure amount of the refrigerant is controlled by the refrigerant amount of flow control valve 57 corresponding to the upward and downward motions of the spindle 8 so that the evaporation temperature or evaporation pressure of the refrigerant of the heat-source-side heat exchanger 54 becomes optimum.

When the compressor 51 stops in FIGS. 7 and 8, the refrigerant flow amount control valves 56 and 57 are kept in the fully closed state (the position A of FIG. 5) and the solenoid valve 58 is kept in the fully opened state. When the refrigerant flow amount control valves 56 and 57, and the solenoid valve 58 are kept in such conditions, the user-side heat exchanger 53 of the indoor unit can be separated from the refrigerating cycle. Thus, even if the refrigerant leaks out in the indoor unit, the leakage can be minimized.

In addition, when the indoor unit detects the leakage of the refrigerant and immediately stops the operation of the compressor 51, since the solenoid valve 58 is in the fully opened state, the pressure of the refrigerant in the refrigerating cycle is balanced by the expansion means (capillary tube). Thus, the leakage of the refrigerator is not increased by the high pressure refrigerant.

Thus, the refrigerant flow amount control valve as shown in FIG. 1, which is used in the refrigerating cycles shown in FIGS. 7 and 8, allows the refrigerant to always flow to the user-side heat exchanger 53 and the heat-source-side heat exchanger 54 in the same direction without an unnecessary pressure loss. Thus, even if a mixture of refrigerants that have different boiling points is used as a working refrigerant of the refrigerating cycle, the heat exchanger corresponding to the different evaporating temperatures can be easily designed. In addition, even if a harmful or dangerous material is used as a refrigerant to be mixed, the leakage of the refrigerant can be minimized, thereby improving the safety of the operation.

Thus, according to the refrigerant flow amount control valve of the present invention, the amount of flow of the refrigerant can be varied from (a) the fully opened state where the first refrigerant flow path, the second refrigerant flow path, and the third refrigerant flow path are used to (b) a freely variable state where only the first refrigerant flow path and the second refrigerant flow path are used.

When the valve body contacts the moving valve seat, the first, second and third refrigerant flow paths can be closed, thereby causing the refrigerant flow amount control valve to be in the fully closed state.

In addition, in the refrigerating apparatus with the refrigerant flow amount control valve that has the above-described construction, the single refrigerant flow amount control valve can control the flow of the refrigerant from the fully opened state (almost no pressure loss) to the fully closed state.

Thus, the number of valves that makeup the refrigerating cycle can be reduced, thereby reducing the size of the refrigerating apparatus.

What is claimed is:

1. A refrigerant flow amount control valve having a common refrigerant flow path between an input and an output, said valve being adjustable between a reduced flow condition and an open state, comprising:

adjusting means for adjusting the amount of flow of a refrigerant from the input through said valve in a predetermined reduced range of flow in a single flow path direction thereof; and a bypass means for causing additional refrigerant to flow from the input through said valve without passing through said adjusting means when said valve is in the open state, and means for combining the flow of refrigerant through said adjusting means and said bypass into a common refrigerant flow path to the output.

2. A refrigerating apparatus with a refrigerating cycle comprising:

a compressor, a condenser, an expansion means and an evaporator, wherein said expansion means has a refrigerant flow amount control valve having an input and output, said valve being adjustable between a reduced flow condition and an open state and including adjusting means for reducing the amount of flow of refrigerant in a flow path from the input through said valve in a predetermined reduced range of flow in a single flow path direction thereof, and means for establishing a bypass for said adjusting means when said valve is in the open state, wherein, when said valve is in the reduced flow condition the refrigerant flows only through said adjusting means and when said valve is in the open state the refrigerant flows through both of said adjusting means and said bypass.

3. A refrigerating apparatus, comprising:

a refrigerating cycle that includes a compressor, a heat-source-side heat exchanger, an expansion means, and a user-side heat exchanger;

refrigerant flow control switching means for causing a refrigerant to flow in order through the compressor, the heat-source-side heat exchanger, the expansion means, and the user-side heat exchanger in a cooling operation state and in order through the compressor, the user-side heat exchanger, the expansion means, and the heat-source-side heat exchanger in a heating operation state, wherein said refrigerant flow path switching means is adapted for switching a refrigerant flow path so as to have a direction of the refrigerant flow path in the heat-source-side heat exchanger and/or the user-side heat exchanger to be in the same direction, and wherein the expansion means includes:

first and second refrigerant flow amount control valves for adjusting the flow amount of the refrigerant and for allowing the refrigerant to flow with substantially no pressure loss in the same refrigerant flow direction, said first refrigerant flow amount control valve being connected to the refrigerant entrance-side of the user-side heat exchanger in the refrigerating cycle and adapted for adjusting the flow amount of the refrigerant in the cooling operation state and for allowing the refrigerant to flow with substantially no pressure loss in the heating operation state; and said second refrigerant flow amount control valve being connected to the refrigerant exit side of the user-side heat exchanger in the refrigerating cycle and adapted for adjusting the flow amount of the refrigerant in the heating operation state and for allowing the refrigerant to flow with substantially no pressure loss in the cooling operation state.

4. The refrigerating apparatus as set forth in claim 2, wherein said refrigerant amount of flow control valve includes:

a first valve seat disposed on the output side of the single flow direction of the refrigerant;

a second valve seat disposed on the output side of the single flow direction of the refrigerant; and a valve body for adjusting the flow amount of the refrigerant of a second refrigerant flow path formed in the second valve seat includes:

a second refrigerant flow path formed at a position aligned with and preceding a first refrigerant flow path which is formed in the first valve seat;

a third refrigerant flow path formed on the outer periphery of the second valve seat as an independent refrigerant flow path, the third refrigerant flow path being formed at a position that is not aligned with the second refrigerant flow path of the second valve seat; and means for moving the second valve seat with and against the refrigerant flow direction.

5. The refrigerating apparatus as set forth in claim 3, wherein said refrigerant amount of flow control valve includes:

a first valve seat disposed on an output side of the single flow direction of the refrigerant;

a second refrigerant flow path formed at a position aligned with and preceding a first refrigerant flow path which is formed in the first valve seat;

a third refrigerant flow path formed on the outer periphery of the second refrigerant flow path being formed at a position that is not aligned with the second refrigerant flow path of the second valve seat; and means for moving the second valve seat with and against the refrigerant flow direction.

6. The refrigerating apparatus as set forth in claim 2, wherein said refrigerant amount of flow control valve includes:

a first valve seat disposed on the output side of the single flow direction of the refrigerant;

a first refrigerant flow path formed in the first valve seat;

a second valve seat tensioned toward the first valve seat so as to close the first refrigerant flow path;

a second refrigerant flow path that is formed in the second valve seat, that has a smaller flow path area than the first refrigerant flow path of the first valve seat, and that is formed aligned with the first refrigerant flow path;

a valve body adapted for moving with and against the refrigerant flow direction so as to vary the amount of flow of the refrigerant in the second refrigerant flow path;

a third refrigerant flow path formed on the outer periphery of the second valve seat as an independent refrigerant flow path formed at a position that is not aligned with the second refrigerant flow path of the second valve seat; and means for causing the second valve seat tensioned toward the first valve seat to be separated from the first valve seat when the valve body moves a predetermined amount in the direction to cause the amount of flow of the refrigerant of the second refrigerant flow path to increase.

7. The refrigerating apparatus as set forth in claim 3, wherein said refrigerant flow amount control valve includes:

a first valve seat disposed on a secondary side of the single flow direction of the refrigerant;

a first refrigerant flow path fixed in the first valve seat;

a second valve seat tensioned to the first valve seat so as to close the first refrigerant flow path;

a second refrigerant flow path that is formed in the second valve seat, that has a smaller flow path area than the first refrigerant flow path of the first valve seat, and that is formed opposite to the first refrigerant flow path;

a valve body adapted for moving forwardly and backwardly against the refrigerant flow direction so as to vary the flow amount of the refrigerant in the second refrigerant flow path;

a third refrigerant flow path that is formed on the outer periphery of the second refrigerant flow path as an independent refrigerant flow path and that is formed at a position that is not opposite to the first refrigerant flow path of the first valve seat; and a construction fix causing the second valve seat tensioned to the first valve seat to be separated from the first valve seat when the valve body moves for a predetermined amount in the direction where the flow amount of the refrigerant of the second refrigerant flow path increases.

8. The refrigerating apparatus as set forth in claim 2, wherein said refrigerant flow amount control valve includes:

a first valve seat disposed on the input side of the single flow direction of the refrigerant;

a first refrigerant flow path formed in the first valve seat;

a second valve seat tensioned toward the first valve seat so as to close the first refrigerant flow path;

a second refrigerant flow path formed in the second valve seat and having a smaller flow path area than the first refrigerant flow path of the first valve seat, and being aligned with the first refrigerant flow path;

a valve body adapted for moving with and against the refrigerant flow direction so as to vary the flow amount of the refrigerant in the second refrigerant flow path;

a third refrigerant flow path formed on the outer periphery of the second valve seat as an independent refrigerant flow path formed at a position that is not aligned with the second refrigerant flow path of the second valve seat; and means for causing the second valve seat tensioned toward the first valve seat to be separated from the first valve seat when the valve body moves a predetermined amount in the direction to cause the amount of flow of the refrigerant of the second refrigerant flow path to increase, and means for causing the refrigerant flow amount control valve to be placed in a fully closed state when the operation of said refrigerant apparatus stops.

9. The refrigerating apparatus as set forth in claim 3, wherein said refrigerant flow amount control valve includes:

a first valve seat disposed on the input side of the single flow direction of the refrigerant;

a first refrigerant flow path formed in the first valve seat;

a second valve seat tensioned toward the first valve seat so as to close the first refrigerant flow path;

a second refrigerant flow path formed in the second valve seat with a smaller flow path area than the first refrigerant flow path of the first valve seat, and being formed aligned with the first refrigerant flow path;

a valve body adapted for moving with and against the refrigerant flow direction so as to vary the amount of flow of the refrigerant in the second refrigerant flow path;

a third refrigerant flow path formed on the outer periphery of the second valve sent as an independent refrigerant flow path formed at a position that is not aligned with the second refrigerant flow path of the second valve seat; and means for causing the second valve seat tensioned toward the first valve seat to be separated from the first valve seat when the valve body moves a predetermined amount in the direction to cause the amount of the refrigerant of the second refrigerant flow path to increase, and means for causing the refrigerant flow amount control valve to be placed in a fully closed state when the operation of said refrigerant apparatus stops.

10. A refrigerant flow amount control valve, comprising:

a first valve seat disposed on an output side in a single flow direction of a refrigerant;

a second valve seat disposed on an input side of the single flow direction of the refrigerant; and a valve body for adjusting the amount of flow of the refrigerant of a second refrigerant flow path formed in said second valve seat, the second refrigerant flow path being formed at a position that is aligned with a first refrigerant flow path formed in said first valve seat;

a third refrigerant flow path being formed on the outer periphery of the second valve set as an independent refrigerant flow path, the third refrigerant flow path being formed at a position that is not aligned with the second refrigerant flow path of said second valve seat; and means for moving said second valve seat with and against the refrigerant flow direction.

11. A refrigerant amount of flow control valve, comprising:

a first valve seat disposed on an output side in a single flow direction of a refrigerant;

a second valve seat tensioned toward said first valve seat so as to close said first refrigerant flow path;

a second refrigerant flow path formed in said second valve seat with a smaller flow path area than said first refrigerant flow path of said first valve seat, and formed aligned with said first refrigerant flow path;

a valve body adapted for moving with and against the refrigerant flow direction so as to vary the amount of flow of the refrigerant in the said second refrigerant flow path;

a third refrigerant flow path formed on the outer periphery of said second second valve seat as an independent refrigerant flow path formed at a position that is not aligned with said second refrigerant flow path of said second valve seat; and means for causing said second valve seat tensioned toward said first valve seat to be separated from said first valve seat when the valve body moves a predetermined amount in the direction to cause the amount of flow of the refrigerant of said second refrigerant flow path to increase.

12. A refrigerant flow amount control valve, comprising:

a valve seat disposed in a refrigerant flow path;

a first valve body for adjusting the amount of flow of the refrigerant in a first refrigerant flow path of the valve seat;

a second valve body for adjusting the amount of flow of the refrigerant of a second refrigerant flow path disposed on the outer periphery of said second valve body, said second refrigerant flow path being different from the first refrigerant flow path of said valve seat; and means for causing said second valve body to move in the direction to cause the amount of flow of the refrigerant that flows in the second refrigerant flow path to increase when said first valve body moves a predetermined amount in the direction to cause the flow amount of the refrigerant in the first refrigerant flow path to increase.

13. A refrigerating apparatus with a refrigerating cycle having a compressor, a condenser, two expansion means, and an evaporator, wherein said both expansion means each have a refrigerant flow amount control valve having an input and output, each said valve being adjustable between a reduced flow condition and an open state, including:

adjusting means for reducing the amount of flow of refrigerant in a flow path from the input through said valve in a predetermined reduced range of flow in a single flow path direction thereof; and means for bypassing said adjusting means when said valve is in the open state, wherein when said valve is in a reduced flow condition, the refrigerant flow is controlled only by said adjusting means, and when said valve is in the open state, the refrigerant flow is controlled both by said adjusting means and said bypass, and during air-conditioning operation, one of said expansion means is in the reduced flow condition, and the other of said expansion means is in the open state.

14. A refrigerating apparatus, comprising:

a compressor, a heat-source-side heat exchanger, a first and second expansion means, and a user-side heat exchanger;

a refrigerant flow path switching means for causing a refrigerant to flow in a refrigerating cycle that includes in order the compressor, the heat-source-side heat exchanger, the first expansion means and the user-side heat exchanger in a cooling operation state and in order the compressor, the user-side heat exchanger, the second expansion means, and the heat-source-side heat exchanger in a heating operation state, said refrigerant flow path switching means adapted for switching a refrigerant flow path so that the direction of the refrigerant flow path in the heat-source-side heat exchanger and/or the user-side heat exchanger is always in the same direction, and said first expansion means including a first refrigerant flow amount control valve for adjusting the flow amount of the refrigerant and for allowing the refrigerant to flow with substantially no pressure loss in the same refrigeration flow direction and said second expansion means including a second refrigerant flow amount control valve for adjusting the flow amount of the refrigerant and for allowing the refrigerant to flow with substantially no pressure loss in same refrigeration flow direction, said first refrigerant flow amount control valve being connected to the refrigerant entrance side of the user-side heat exchanger in the refrigerating cycle and adjusting the flow amount of the refrigerant in the cooling operation state and allowing the refrigerant to flow with substantially no pressure loss in the heating operation state, and said second refrigerant flow amount control valve being connected to the refrigerant exit side of the user-side heat exchanger in the refrigerating cycle and adjusting the flow amount of the refrigerant in the heating operation state and allowing the refrigerant to flow with substantially no pressure loss in the cooling operation state.

* * * * *